United States Patent [19]

Yamoto et al.

[11] Patent Number: 5,587,059
[45] Date of Patent: Dec. 24, 1996

[54] ANTICORROSIVE CATHODIC ELECTRODEPOSITION PAINT

[75] Inventors: Shuhei Yamoto, Hirakata; Koji Ito, Ibaraki; Mitsuo Yamada, Suita, all of Japan

[73] Assignee: Nippon Paint Co., Ltd., Japan

[21] Appl. No.: 513,232

[22] Filed: Aug. 10, 1995

[30] Foreign Application Priority Data

Aug. 11, 1994 [JP] Japan ..................................... 6-212094
Aug. 11, 1994 [JP] Japan ..................................... 6-212095

[51] Int. Cl.$^6$ ..................................................... C25D 9/02
[52] U.S. Cl. ........................... 204/505; 204/501; 523/415
[58] Field of Search ........................... 204/181.7, 181.4; 523/415

[56] References Cited

U.S. PATENT DOCUMENTS

| | | | |
|---|---|---|---|
| 4,352,842 | 10/1982 | Kooymans et al. | 204/181.7 |
| 5,276,072 | 1/1994 | Ishii et al. | 523/415 |
| 5,298,148 | 3/1994 | Yasuoka et al. | 205/50 |
| 5,318,681 | 6/1994 | Murasr et al. | 204/181.7 |

FOREIGN PATENT DOCUMENTS 05140487  6/1993  Japan .

*Primary Examiner*—Bruce F. Bell
*Assistant Examiner*—Kishor Mayekar
*Attorney, Agent, or Firm*—Millen, White, Zelano, & Branigan, P.C.

[57] ABSTRACT

A cathodic electrodeposition paint for protecting a surface-untreated colled rolled steel substrate comprises a cationic film-forming epoxy resin and a crosslinker, both dispersed in an aqueous medium containing a neutralizing agent, and additionally contains, as an anticorrosive agent, a combination of a cerium compound with either a polyvalent metal phosphomolybdate or a copper compound.

21 Claims, No Drawings

ANTICORROSIVE CATHODIC ELECTRODEPOSITION PAINT

BACKGROUND OF THE INVENTION

This invention relates to an anticorrosive cathodic electrodeposition paint to be applied on, for example, cold rolled steel sheets having no surface treatment.

Electrodeposition paints have an excellent throwing power and can form a protective film of uniform thickness on metallic substrates to protect the substrates from corrosion. For this reason the paints are extensively used in the automobile industry as a primer coating of bodies and other parts. The paint may exhibit a satisfactory anticorrosive effect when the substrate is subjected to a surface treatment such as zinc phosphate treatment before electrodeposition coating. However, when the substrate does not receive a satisfactory surface treatment, the paint will show only a poor anticorrosive effect unless a lead-containing anticorrosive pigment such as basic lead silicate is added to the paint. Because the use of lead pigments should be avoided or reduced for ecological reasons, attempts have been made to replace the lead pigments with other anticorrosive pigments such as phosphate pigments, molybdate pigments, borate pigments and the like. Similar attempts have been made to use ferric oxide (JP-A-02279773), bismuth hydroxide/tin, cerium hydroxide/tin, nickel hydroxide/tin (JP-A-05140487), bismuth/tin (JP-A-05247385), copper, nickel, zinc, cobalt, chromium, aluminum, manganese, zirconium, tin and iron (JP-A-04325572). However, none of the above attemps have been proven successful to impart cathodic electrodeposition paints with anticorrosive properties comparable to lead pigments.

Therefore, a need exists for a cathodic electrodeposition paint which eliminates or reduces the use of a lead pigment but has a satisfactory anticorrosive property comparable to or even better than the paint containing the lead pigment when applied on, for example, untreated cold rolled steel sheets.

SUMMARY OF THE INVENTION

The above need may be met by the cathodic electrodeposition paint of the present invention. According to the present invention, the paint comprises a cationic film-forming epoxy resin and a crosslinker dispersed in an aqueous medium containing a neutralizing agent and additionally an anticorresively effective amount of a combination of a cerium compound with a polyvalent metal phosphomolybdate or a copper compound.

In a preferred embodiment, the paint contains, based on the combined weight of the film-forming resin and crosslinker as solids, from 0.01 to 2.0% as metals of a water soluble cerium (III) salt, and from 0.1 to 20% of aluminum, calcium or zinc phosphomolybdate, respectively.

In another preferred embodiment, the paint contains, based on the combined weight of the film-forming resin and crosslinker as solids, from 0.01 to 2.0% as metals of a combination of a copper (II) compound and a water-soluble cerium (III) compound, the weight ratio as metals of the copper compound/cerium compound being from 1/20 to 20/1.

DETAILED DESCRIPTION OF THE PREFERRED EMBODIMENTS

The present invention employs as an anticorrosive agent to be formulated into cathodic electrodeposition paints a combination of a cerium compound with either a polyvalent metal phosphomolybdate or a copper compound. Preferred cerium compounds for this purpose include water-soluble cerium (III) salts, such as monocarboxylates, e.g. formate, acetate, propionate or lactate; inorganic acid salts, e.g. nitrate, sulfate or phosphate; and halides, e.g. chloride or bromide. Other cerium compounds capable of releasing cerium (III) ions in water, such as oxide or hydroxide may also be used. Water soluble monocarboxylates and nitrate are preferable.

Preferred class of polyvalent metal phosphomolybdates are aluminum phosphomolybdate, calcium phosphomolybdate and zinc phosphomolybdate.

Preferred copper compounds include water-soluble copper (II) salts such as monocarboxylates, e.g. formate, acetate, propionate or lactate; inorganic acid salts, e.g. nitrate, sulfate or phosphate; and halides, e.g. chloride or bromide. Also usable is a complex of the formula:

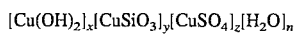

wherein x, y, z and n are weight fractions and each is 18–80%, 0 to 12%, 20 to 60% and the balance, of 100% respectively n=100% −(x+y+z). Water-soluble monocarboxylates and the above complex are most preferable.

When used in combination with the phosphomolybdate, the amount of cerium compound is generally from 0.01 to 2%, preferably from 0.1 to 0.8%, of the combined weight of the cationic film-forming resin and crosslinker as solids. The amount of phosphomolybdate is generally from 0.1 to 20%, preferably from 1 to 10%, of the combined weight of the cationic film-forming resin and crosslinker.

When a cerium compound is combined with a copper compound, the weight ratio of cerium/copper as metals may vary within a range between 1/20 and 20/1. The total amount of cerium and copper as metals is generally from 0.01 to 2%, preferably from 0.1 to 0.8%, of the combined weight of the cationic film-forming resin and crosslinker.

Care should be taken in either case to avoid excessive addition of water soluble cerium or copper salts which will often adversely affect the Coulomb efficiency of the electrodeposition process and the surface smoothness of deposited films, and, therefore, should be avoided. In addition the addition of cerium compounds alone has been proven to be not effective to achieve a satisfactory result.

When the above additives are not soluble in water, they may be added to the paint formulation as a pigment dispersion prepared by, as is conventional, milling them with a solution of pigment dispersing resin such as sulfonium type cationic epoxy resins, quaternary ammonium type cationic epoxy resins, tertiary amine type cationic epoxy resins or quaternary ammonium type cationic acrylic resins. The paste may also contain a conventional pigment. When the additives are soluble in water, they may be added directly to the paint formulation as an aqueous solution.

Cationic film-forming epoxy resins used in cathodic electrodeposition paints are well-known in the art. They may be produced by reacting a bisphenol epoxy resin with a cationic active hydrogen compound such as a primary or secondary amine, a tertiary amine acid addition salt to open all of the epoxy groups. The starting epoxy resins typically have an epoxy equivalent weight from 100 to 10,000, preferably from 1,000 to 3,000. Included in the term "cationic film-forming epoxy resin" is an amine-modified oxazolidone ring-containing epoxy resin disclosed in commonly assigned U.S. Pat. No. 5,276,072, the entire disclosure of which is incorporated herein by reference. Briefly, these cationic resins may be produced by reacting a bisphenol epoxy resin with a bisurethane derived from an organic diisocyanate and then reacting the resulting modified epoxy resin with a cationic active hydrogen compound to open all of the epoxy groups. The film-forming cationic epoxy resins typically have a base equivalent from 40 to 150 meq./100 g, preferably from 60 to 100 meq./100 g.

The crosslinker may be a blocked polyisocyanate produced by reacting an organic polyisocyanate and a blocking agent. Examples of organic polyisocyanates include aromatic, alicyclic or aliphatic polyisocyanates such as tolylenediisocyanate, xylylenediisocyanate, 4,4'-diphenylmethanediisocyanate, hexamethylenediisocyanate, isophoronediioscyanate and their isocyanurates. The blocking agent is desirably selected such that the resulting blocked polyisocyanate is stable at ambient temperature but can regenerate the free isocyanate function upon heating at 100°–200° C. Examples of such blocking agents include lactams such as ε-caprolactam or δ-butyrolactam; phenols such as phenol, cresol or xylenol; alcohols such as methanol, ethanol, furfuryl alcohol or butylcellosolve; and oximes such as methyl ethyl ketoxime or cyclohexanoneoxime. Tin compounds such as dibutyltin oxide or dibutyltin dilaurate may be used as an unblocking catalyst.

The amount of crosslinker must be sufficient to give a rigid film through a crosslinking reaciton with the cationic film-forming resin. Usually the ratio of the cationic film-forming resin to the crosslinker as solids is from 90:10 to 50:50.

The cationic film-forming resin and the crosslinker are dispersed in a aqueous medium containing a neutralizing acid such as formic, acetic, propionic, lactic, citric, malic, tartaric, acrylic, hydrochloric or phosphoric acid.

The cathodic electrodeposition paint of the present invention may contain a variety of conventional additives. For example, coloring pigments such as titanium dioxide, carbon black or ferric oxide and extender pigments such as talc, calcium carbonate, clay or silica may be added in the form of a pigment dispersion paste. If desired, other anticorrosive or rustproof pigments such as strontium chromate, zinc chromate, aluminum phosphate, zinc phosphate, calcium phosphate or barium metaborate may also be added. Other additives include surface regulators and organic solvents.

The paint may be applied on a substrate using the conventional cathodic electrodeposition method. Usually, the paint is adjusted to 5 to 40%, preferably 15 to 20% solids with deionized water and at a pH from 5.5 to 8.5. The electrodeposition may be carried out at a bath temperature from 20° to 35° C. at a voltage from 100 to 400 V until a dry film thickness from 5 to 60 microns, preferably from 10 to 40 microns is reached. Then the film may be baked at a temperature from 100° to 200° C., preferably from 150° to 180° C. for 10 to 30 minutes.

The following examples are intended to illustrate the present invention without limiting thereto. All parts and percents are by weight unless otherwise indicated.

PRODUCTION EXAMPLE 1

Cationic resin produced from oxazolidone ring-containing epoxy resin

A flask equipped with a stirrer, condenser, nitrogen gas tube, thermometer and drip funnel was charged with 92 g of 2,4-/2,6- tolylenediisocyanate (80:20 weight ratio), 95 g of methyl isobutyl ketone (MIBK) and 0.5 g of dibutyltin dilaurate. To the mixture was added dropwise 21 g of methanol over 30 minutes while stirring. The inner temperature rose to 60° C. during this period. After continuing the reaction for additional 30 minutes, 57 g of ethylene glycol mono-2-ethylhexyl ether and thereafter 42 g of bisphenol A-propylene oxide (5 moles) adduct were added dropwise successively. The mixture was allowed to react at 60°–65° C. until the absorption of isocyanato group disappeared in IR spectometry. Thereafter, 365 g of bisphenol A epoxy resin having an epoxy equivalent weight of 188 was added. After raising the temperature to 125° C., 1.0 g of benzyldimethylamine was added and the reaction was continued until an epoxy equivalent weight of 410 was reached. Then, 87 g of bisphenol A was added and allowed to react at 120° C. whereupon an epoxy equivalent weight of 1190 was reached. After cooling, a mixture of 11 g of diethanolamine, 24 g of N-methylethanolamine and 25 g of aminoethylethanolamine ketimine (79% solution in MIBK) was added to the flask and allowed to react at 110° C. for 2 hours. The product was diluted to 80% nonvolatiles with MIBK.

PRODUCTION EXAMPLE 2

Blocked polyisocynate

The same flask as used in Production Example 1 was charged with 199 g of hexamethylenediisocyanate trimer (CORONATE EX sold by Nippon Polyurathane K.K.) and 11.3 g of ε-caprolactam. The content was heated to 80° C. to make a solution. To this was added 32 g of MIBK, 0.05 g of dibutyltin dilaurate and 0.05 g of 1,8-diazabicyclo[5,4,0]-7-undecene. Then 78.3 g of methyl ethyl ketoxime was added dropwise while stirring and nitrogen gas bubbling over 1 hour to the flask and allowed to react until the absorption of isocyanato group disappeared in IR spectrometry.

PRODUCTION EXAMPLE 3

Pigment dispersant resin

Step 1:

The same flask as used in Production Example 1 was charged with 222.0 g of isophoronediisocyanate, 39.1 g of MIBK and 0.2 g of dibutyltin dilaurate and the content was heated 50° C. To this was added 131.5 g of 2-ethylhexanol with stirring and nitrogen gas bubbling over 2 hours while keeping the temperature at 50° C. to obtain 2-ethylhexanol-blocked isophoronediioscyanate.

Step 2:

In the same flask as used in Production Example 1, 376.0 g of EPON 828(epoxy resin sold by Shell Chemical) was reacted with 114.0 g of bisphenol A in the presence of 0.75 g of dimethylbenzylamine under the nitrogen gas atmosphere at 170° C. for 1 hour until an epoxy equivalent weight of 490 was reached. After cooling to 140° C., 198.4 g of 2-ethylhexanol-blocked isophoronediisocyanate produced in Step 1 was added to the flask and allowed to react at 140° C. for 1 hour. Then 161.8 g of ethylene glycol monobutyl ether was added. After cooling to 100° C., a mixture of 366.0 g of thioethanol, 134.0 g of dimethylolpropionic acid and 144.0 g of deionized water was added to the flask and allowed to react at 70°–75° C. until an acid number of 0.241 was reached. The product was then diluted with 353.3 g of ethylene glycol monobutyl ether. The conversion rate to sulfonium was 82%. A pigment dispersant resin having 50% solids was produced.

PRODUCTION EXAMPLE 4

Pigment paste

A pigment paste was prepared by milling the pigment dispersant resin of Production Example 3, carbon black, kaolin, titanium dioxide and a phosphomolybdate in the following proportions in a sand mill.

| Material | Parts of weight |
|---|---|
| Pigment dispersant resin (50% solids) | 60 |
| Carbon black | 2 |
| Kaolin | 15 |
| Titanium dioxide + Phosphomolybdate* | 83 |
| Deionized water | 40 |

*The mixture consists of 2 parts (for 0.5% addition), 15 parts (for 3.75% addition), 40 parts (for 10% addition) or 72 parts (for 18% addition) of a phosphomolybdate and the balance of titanium dioxide.

EXAMPLES 1–9 AND COMPARATIVE EXAMPLES 1–9

350 g as solids of the resin of Production Example 1 was blended with 150 g as solid of the crosslinker of Production Example 2, and 15 g of ethylene glycol mono-2-ethylhexyl ether was added to the mixture. Then the mixture was neutralized with acetic acid to 40.5% neutralization and gradually diluted with deionized water while distilling off ethylene glycol mono-2-ethylhexyl ether to 36.0% solids. 2,000 g of an emulsion thus produced was mixed with 460.0 g of one of pigment pastes of Production Example 4, 2,252 g of deionized water and 1.0% by weight of solids of dibutyltin dilaurate to prepare a cathodic electrodeposition paint of 20.0% solids. Cerium and copper compounds were added as an aqueous solution to a concentration as metals as shown Tables 1 and 2.

The paint was applied electrically on a surface untreated cold rolled steel sheet to a dry film thickness of 20 microns, baked at 160° C. for 10 minutes, and evaluated for film properties. The results of Example and Comparative Examples are shown in Table 1 and Table 2, respectively.

TABLE 1

| | Example | | | | | | | | |
|---|---|---|---|---|---|---|---|---|---|
| | 1 | 2 | 3 | 4 | 5 | 6 | 7 | 8 | 9 |
| Molybdate, %: | | | | | | | | | |
| Aluminum salt | 3.75 | 3.75 | 3.75 | 0.5 | 10 | — | — | 18 | 3.75 |
| Calcium salt | — | — | — | — | — | — | 10 | — | — |
| Zinc salt | — | — | — | — | — | 10 | — | — | — |
| Cerium compounds, % metal: | | | | | | | | | |
| Acetate | 0.05 | 0.5 | 1.8 | 0.5 | 0.5 | 0.5 | 0.5 | 0.5 | — |
| Nitrate | — | — | — | — | — | — | — | — | 0.5 |
| Performance: | | | | | | | | | |
| Surface smoothness[1] | G | G | G | G | G | G | G | G | G |
| Impact strength[2] | G | G | G | G | G | G | G | G | G |
| Filterability[3] | G | G | G | G | G | G | G | G | G |
| Salt spray test[4]: | | | | | | | | | |
| Peeling | G | G | G | G | G | G | G | G | G |
| Blister | G | G | G | G | G | G | G | G | G |
| Salt dipping test[5]: | | | | | | | | | |
| Peeling | G | G | G | G | G | G | G | G | G |
| Blister | G | G | G | G | G | G | G | G | G |

G: Good

TABLE 2

| | Comparative Examples | | | | | | | | |
|---|---|---|---|---|---|---|---|---|---|
| | 1 | 2 | 3 | 4 | 5 | 6 | 7 | 8 | 9 |
| Molybdate, %: | | | | | | | | | |
| Aluminum salt | — | 3.75 | — | — | — | 3.75 | 3.75 | 0.2 | 3.75 |
| Other metal compd., % metal: | | | | | | | | | |
| Cerium acetate | — | — | 0.5 | — | — | 2.2 | 0.005 | 0.05 | — |
| Copper acetate | — | — | — | 0.3 | — | — | — | — | — |
| Cerium hydroxide | — | — | — | — | 2.0 | — | — | — | 1.8 |

TABLE 2-continued

|  | Comparative Examples | | | | | | | | |
| --- | --- | --- | --- | --- | --- | --- | --- | --- | --- |
|  | 1 | 2 | 3 | 4 | 5 | 6 | 7 | 8 | 9 |
| Performance: | | | | | | | | | |
| Surface smoothness[1] | G | G | G | F | G | B | G | G | G |
| Image strength[2] | G | G | G | B | G | B | G | G | G |
| Filterability[3] | G | G | G | G | G | B | G | G | G |
| Salt spray test[4]: | | | | | | | | | |
| Peeling | B | F | F | F | F | B | F | F | B |
| Blister | B | F | G | F | F | B | F | F | B |
| Salt dipping test[5]: | | | | | | | | | |
| Peeling | B | F | B | G | F | B | F | B | B |
| Blister | B | F | F | G | F | B | F | B | B |

G: Good;
F: Fair;
B: Bad

Evaluation Methods

1) Surface smoothness:

The appearance of films was visually evaluated. 2) Impact Strength:

Using a Du Pont impact strength tester, the specimen was impacted with a ½ inch hammer at a height of 50 cm at 20° C. at 60% R.H., and then the recessed area was visually evaluated.

Good: No change

Fair: Fine cracks

Bad: Large cracks

3) Filterability:

The paint was filtered through a 380 mesh screen. The filterability was determined by the quantity of residue on the screen.

Good: No residue

Fair: Small amount of residue

Bad: Large amount of residue

4) Salt spray test:

The paint film was cut in cross with a knife reaching to the substrate and sprayed with 5% saline for 480 hours at 35° C.

Peeling was judged by the maxium peeled width measured from the cut line.

Good: Less than 3 mm

Fair: 3 mm to 6 mm

Bad: Greater than 6 mm

Blister was judged by the number of blisters within 15 cm×7 cm area,

Good: Very few

Fair: Few

Bad: Many

5) Salt dipping test:

The paint film was cut in cross with a knife reaching to the substrate and dipped in 5% saline for 120 hours at The evaluation method is the same as the salt spray test.

PRODUCTION EXAMPLE 5

Pigment paste

A pigment paste was prepared by milling the pigment dispersant resin of Production Example 3, carbon black, kaolin and titanium dioxide in the following proportions in a sand mill.

| Material | Parts by weight |
| --- | --- |
| Pigment dispersant resin (50% solids) | 60 |
| Carbon black | 2 |
| Kaolin | 15 |
| Titanium dioxide | 53 |
| Deionized water | 40 |

EXAMPLES 10–17 AND COMPARATIVE EXAMPLES 10–15

350 g as solids of the resin of Production Example 1 was blended with 150 g as solids of the crosslinker of Production Example 2, and 15 g of ethylene glycol mono-2-ethylhexyl ether was added to the mixture. Then the mixture was neutralized with acetic acid to 40.5% neutralization and gradually diluted with deionized water while distilling off ethylene glycol mono-2-ethylhexyl ether to 36.0% solids. 2,000 g of an emulsion thus produced was mixed with 460.0 g of the pigment paste of Production Example 5, 2252 g of deionized water and 1.0% by weight of solids of dibutyltin dilaurate to prepare a cathodic electrodeposition paint of 20.0% solids. Cerium and copper compounds were added as an aqueous solution of acetate or nitrate to a concentration as metals as shown in Tables 3 and 4. Water-insoluble copper and cerium compounds were added by replacing the corresponding amount of titanium dioxide in the pigment paste with an amount of the water-insoluble compound shown in Tables 3 and 4.

The paint was applied electrically on a surface untreated cold rolled steel sheet to a dry film thickness of 20 microns, baked at 160° C. for 10 minutes, and evaluated for film properties as in Examples 1–9 and Comparative Examples 1–9. The results of Examples and Comparative Examples are shown in Table 3 and Table 4, respectively.

TABLE 3

| | Example | | | | | | | |
|---|---|---|---|---|---|---|---|---|
| | 1 | 2 | 3 | 4 | 5 | 6 | 7 | 8 |
| Cu and Ce compd., % metal: | | | | | | | | |
| Cu acetate | 0.1 | 0.1 | 0.1 | 0.1 | 0.1 | — | — | 0.1 |
| Cu Complex[1)] | — | — | — | — | — | 0.1 | — | — |
| Cu oxide | — | — | — | — | — | — | 0.1 | — |
| Ce oxide | 1.5 | 0.05 | — | — | — | — | — | — |
| Ce acetate | — | — | 0.35 | 0.35 | — | 0.35 | — | — |
| Ce nitrate | — | — | — | — | 0.35 | — | 0.35 | — |
| Ce hydroxide | — | — | — | — | — | — | — | 0.35 |
| Performance: | | | | | | | | |
| Surface smoothness[2)] | G | G | G | G | G | G | G | G |
| Salt spray test[3)]: | | | | | | | | |
| Peeling | G | G | G | G | G | G | G | G |
| Blister | G | G | G | G | G | G | G | G |
| Salt dipping test[4)] | | | | | | | | |
| Peeling | G | G | G | G | G | G | G | G |
| Blister | G | G | G | G | G | G | G | G |

G: Good

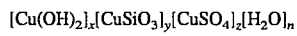

TABLE 4

| | Comparative Example | | | | | |
|---|---|---|---|---|---|---|
| | 1 | 2 | 3 | 4 | 5 | 6 |
| Metal compd., % metal: | | | | | | |
| Cu acetate | — | 0.1 | — | — | 0.24 | 0.1 |
| Ce acetate | — | — | 0.35 | — | — | 2.2 |
| Ce hydroxide | — | — | — | 2.0 | — | — |
| Mg acetate | — | — | — | — | 0.21 | — |
| Performance: | | | | | | |
| Surface smoothness[2)] | G | G | G | G | B | B |
| Salt spray test[3)]: | | | | | | |
| Peeling | B | F | G | F | G | B |
| Blister | B | B | G | F | F | B |
| Salt dipping test[4)] | | | | | | |
| Peeling | B | G | B | F | G | B |
| Blister | B | G | F | F | G | B |

G: Good;
F: Fair;
B: Bad

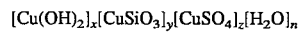

$$[Cu(OH)_2]_x[CuSiO_3]_y[CuSO_4]_z[H_2O]_n$$

wherein x, y, z and n are weight fractions in per cents and each is 50%, 3.2%, 35% and the balance, respectively.

2), 3), 4), Same as Examples 1–5 and Comparative Examples 1–9.

We claim:

1. In a cathodic electrodeposition paint composition comprising a cationic film-forming epoxy resin and a crosslinker, said crosslinker is a blocked polyisocyanate, both dispersed in an aqueous medium containing a neutralizing agent, the improvement wherein said paint composition further comprises an anticorrosively effective amount of a combination of a water-soluble cerium compound and either a polyvalent metal phosphomolybdate or a copper compound.

2. A cathodic electrodeposition paint composition of claim 1, wherein said cerium compound is cerium (III) nitrate or a cerium (III) monocarboxylate.

3. A cathodic electrodeposition paint composition of claim 2, wherein said polyvalent metal phosphomolybdate is aluminum phosphomolybdate, calcium phosphomolybdate or zinc phosphomolybdate.

4. A cathodic electrodeposition paint composition of claim 3, wherein said composition contains, based on the combined weight of said cationic film-forming epoxy resin and said crosslinker as solids, 0.01–2.0% as metal of said cerium compound and 0.1–20% of said polyvalent phosphomolybdate.

5. A method of protecting a surface-untreated cold rolled steel substrate from corrosion comprising:

applying electrically onto a surface thereof a film of a cathodic electrodeposition paint composition of claim 4, and baking the paint film at an elevated temperature.

6. A cathodic electrodeposition paint composition of claim 2, wherein said copper compound is an organic copper (II) salt, an inorganic copper (II) salt, or a complex of the formula:

$$[Cu(OH)_2]_x[CuSiO_3]_y[CuSO_4]_z[H_2O]_n$$

wherein x, y, z and n are weight fractions in % and are each, respectively, 10–80%, 0–12%, 20–60% and the balance.

7. A cathodic electrodeposition paint composition of claim 6 containing, based on the combined weight of said cationic film-forming epoxy resin and said cross-linker as solids, 0.01–2.0% as metals of a combination of said cerium compound and said copper compound, and wherein the weight ratio as metals of said cerium compound to said copper compound is 1:20–20:1.

8. A method of protecting a surface-untreated cold rolled steel substrate from corrosion comprising:

applying electrically onto a surface thereof a film of a cathodic electrodeposition paint composition of claim 6, and baking the paint film at an elevated temperature.

9. A cathodic electrodeposition paint composition of claim 1, wherein said cationic film-forming epoxy resin contains a plurality of oxazolidone rings in its backbone.

10. A method for protecting a surface-untreated cold rolled steel substrate from corrosion comprising:

applying electrically onto a surface thereof a film of a cathodic electrodeposition paint composition of claim 1, and baking the paint film at an elevated temperature.

11. A cathodic electrodeposition paint of claim 1, wherein:

said cationic film-forming epoxy resin contains a plurality of oxazolidone rings in the backbone;

said cerium compound is cerium (III) nitrate or a cerium (III) monocarboxylate;

said polyvalent metal phosphomolybdate is aluminum phosphomolybdate, calcium phosphomolybdate or zinc phosphomolybdate; and said paint contains, based on the combined weight of said cationic film-forming epoxy resin and said crosslinker as solids, 0.01–2.0% as metal of said cerium compound, and 0.1–20% of said polyvalent phosphomolybdate.

12. A cathodic electrodeposition paint of claim 1, wherein:

said cationic film-forming epoxy resin contains a plurality of oxazolidone rings in the backbone;

said cerium compound is cerium (III) nitrate or a cerium (III) monocarboxylate;

said copper compound is a copper (II) salt or a complex of the formula:

$$[Cu(OH)_2]_x[CuSiO_3]_y[CuSO_4]_z[H_2O]_n$$

wherein x, y, z and n are weight fractions in % and are each 18–80%, 0–12%, 20–60% and the balance, respectively; and said paint contains, based on the combined weight of said cationic film-forming epoxy resin and said crosslinker as solids, 0.01–2.0% as metals of a combination of said cerium compound and said copper compound, and the weight ratio as metals of said cerium compound to said copper compound is 1:20–20:1.

13. A method of protecting a corrosion-susceptibly untreated surface of a steel substrate from corrosion which comprises applying thereto by electrodeposition a film of a paint composition of claim 1 and curing the paint film at 100°–200° C.

14. A cathodic electrodeposition paint composition according to claim 1, wherein said copper compound is a water-soluble copper (II) salt and said salt is copper (II) formate, copper (II) acetate, copper (II) propionate, copper (II) lactate, copper (II) nitrate, copper (II) sulfate, copper (II) phosphate, copper (II) chloride or copper (II) bromide.

15. A cathode electrodeposition paint composition according to claim 1, wherein said composition contains the water-soluble cerium compound and the polyvalent metal phosphomolybdate and said cerium compound is present in an amount of 0.1–0.8% based on the combined weight of the cationic film-forming epoxy resin and said crosslinker as solids.

16. A cathode electrodeposition paint composition according to claim 15, wherein said phosphomolybdate is present in an amount of 1–10% based on the combined weight of the cationic film-forming epoxy resin and said crosslinker as solids.

17. A cathodic electrodeposition paint composition according to claim 1, wherein said composition contains the water-soluble cerium compound and the copper compound and wherein said cerium compound and said copper compound are present as metals in a total amount of 0.1–0.8% based on the combined weight of said cationic film-forming epoxy resin and said crosslinker as solids.

18. A cathodic electrodeposition paint composition according to claim 17, wherein said copper compound and said water-soluble cerium compound are present in a weight ratio, as metals, of 1:20 to 20:1.

19. A cathodic electrodeposition paint composition according to claim 1, wherein said water-soluble cerium compound is cerium (III) formate, cerium (III) acetate, cerium (III) propionate, cerium (III) lactate, cerium (III) nitrate, cerium (III) sulfate, cerium (III) phosphate, cerium (III) chloride or cerium (III) bromide.

20. A cathodic electrodeposition paint composition according to claim 1, wherein said paint contains 5–40% solids with deionized water at a pH of 5.5–8.5.

21. A cathodic electrodeposition paint composition according to claim 1, wherein said cationic film-forming epoxy resin and said crosslinker as solids are present in a weight ratio of 90:10–50:50.

\* \* \* \* \*